(12) United States Patent
Motz

(10) Patent No.: US 12,369,521 B2
(45) Date of Patent: Jul. 29, 2025

(54) PROTECTIVE COVER

(71) Applicant: Adam Motz, Bourbon, IN (US)

(72) Inventor: Adam Motz, Bourbon, IN (US)

(73) Assignee: Adam Motz, Bourbon, IN (US)

( * ) Notice: Subject to any disclaimer, the term of this patent is extended or adjusted under 35 U.S.C. 154(b) by 749 days.

(21) Appl. No.: 17/742,939

(22) Filed: May 12, 2022

(65) Prior Publication Data

US 2022/0361397 A1 Nov. 17, 2022

Related U.S. Application Data

(60) Provisional application No. 63/187,503, filed on May 12, 2021.

(51) Int. Cl.
*A01C 23/00* (2006.01)
*A01C 7/06* (2006.01)

(52) U.S. Cl.
CPC ............ *A01C 23/008* (2013.01); *A01C 7/06* (2013.01)

(58) Field of Classification Search
CPC ............ A01C 23/008; A01C 7/06; B05B 1/28
See application file for complete search history.

(56) References Cited

U.S. PATENT DOCUMENTS

| | | | | |
|---|---|---|---|---|
| 4,607,581 A * | 8/1986 | Kopecky | ............... | A01C 5/062 111/151 |
| 8,292,000 B2 * | 10/2012 | Takami | ............... | E02F 3/7627 172/813 |
| 9,085,860 B2 * | 7/2015 | Dubiel | ............... | E01H 5/067 |
| 10,053,826 B1 * | 8/2018 | Null | ............... | E01H 5/067 |
| 10,973,220 B2 * | 4/2021 | Clayton | ............... | B05B 1/28 |
| 11,180,899 B2 * | 11/2021 | Burenga | ............... | E02F 3/4133 |
| 2005/0263053 A1 * | 12/2005 | Schaffert | ............... | A01C 5/062 111/189 |
| 2009/0308296 A1 * | 12/2009 | Senchuk | ............... | A01C 7/06 111/8 |
| 2014/0196322 A1 * | 7/2014 | Dubiel | ............... | E01H 5/067 37/234 |
| 2016/0121354 A1 * | 5/2016 | Turnage | ............... | B05B 12/34 239/499 |
| 2016/0212933 A1 * | 7/2016 | Block | ............... | A01C 23/007 |
| 2017/0360022 A1 * | 12/2017 | Clayton | ............... | A01M 7/0064 |
| 2019/0090417 A1 * | 3/2019 | Conrad | ............... | A01C 5/068 |
| 2020/0383263 A1 * | 12/2020 | Rice | ............... | A01B 79/005 |
| 2021/0251133 A1 * | 8/2021 | Wagler | ............... | A01C 23/025 |

* cited by examiner

Primary Examiner — Jamie L McGowan
(74) Attorney, Agent, or Firm — Sanders Pianowski

(57) ABSTRACT

A protective cover in combination with a liquid fertilizer system prevents leftover plant matter from damaging a tube carrying liquid fertilizer, particularly when the field is no-till. The protective cover is installed, without modification to the planter or liquid fertilizer system, using a mounting flange that is attached to a leading wall through a standoff wall. A bottom angled wall is located opposite the standoff wall. Side walls extend from the leading wall and cooperate with the bottom angled wall to form a protective area for the liquid fertilizer tube. When in use, the leftover plant matter contacts the protective cover instead of the liquid fertilizer tube. The protective cover may include access gaps between the side walls and the standoff wall and/or bottom angled wall, depending on the configuration of the liquid fertilizer system.

18 Claims, 8 Drawing Sheets

PROTECTIVE COVER

CROSS REFERENCE TO RELATED APPLICATIONS

This application claims the benefit of Provisional Application Ser. No. 63/187,503 filed May 12, 2021, the disclosures of which are incorporated by reference.

BACKGROUND OF THE INVENTION

The present disclosure relates to fertilizer placement systems that are attached to seed planters. The fertilizer placement systems apply a continuous line of fertilizer adjacent the seed row. With crop rotation and planting, stalks or leftover plant material from the previous crop can interfere with and/or damage fluid lines, tubing, connections, or the like. This can occur in a no-till, minimum till, or even with a clean till planting scenario. A broken or damaged fluid line creates spillage, waste, and headaches for the planter. The planter must constantly stop and check while planting to replace/repair damaged components to keep the liquid fertilizer from being applied improperly. Therefore, a need currently exists to prevent parts from being damaged from previous crop residue.

SUMMARY OF THE INVENTION

The present disclosure describes a protective cover that shields fragile fluid lines and attaches directly to the fertilizer placement system, using existing mounting bolts and/or holes. The protective cover can be formed from injection molding, metal bending, or other materials and processes. As installed, the cover forms a protected cavity between the protective cover and the fertilizer placement system. The fluid lines pass through the cavity and are shielded from damage by debris in the field, such as leftover plant material.

DESCRIPTION OF THE PREFERRED EMBODIMENT

Figure 1:
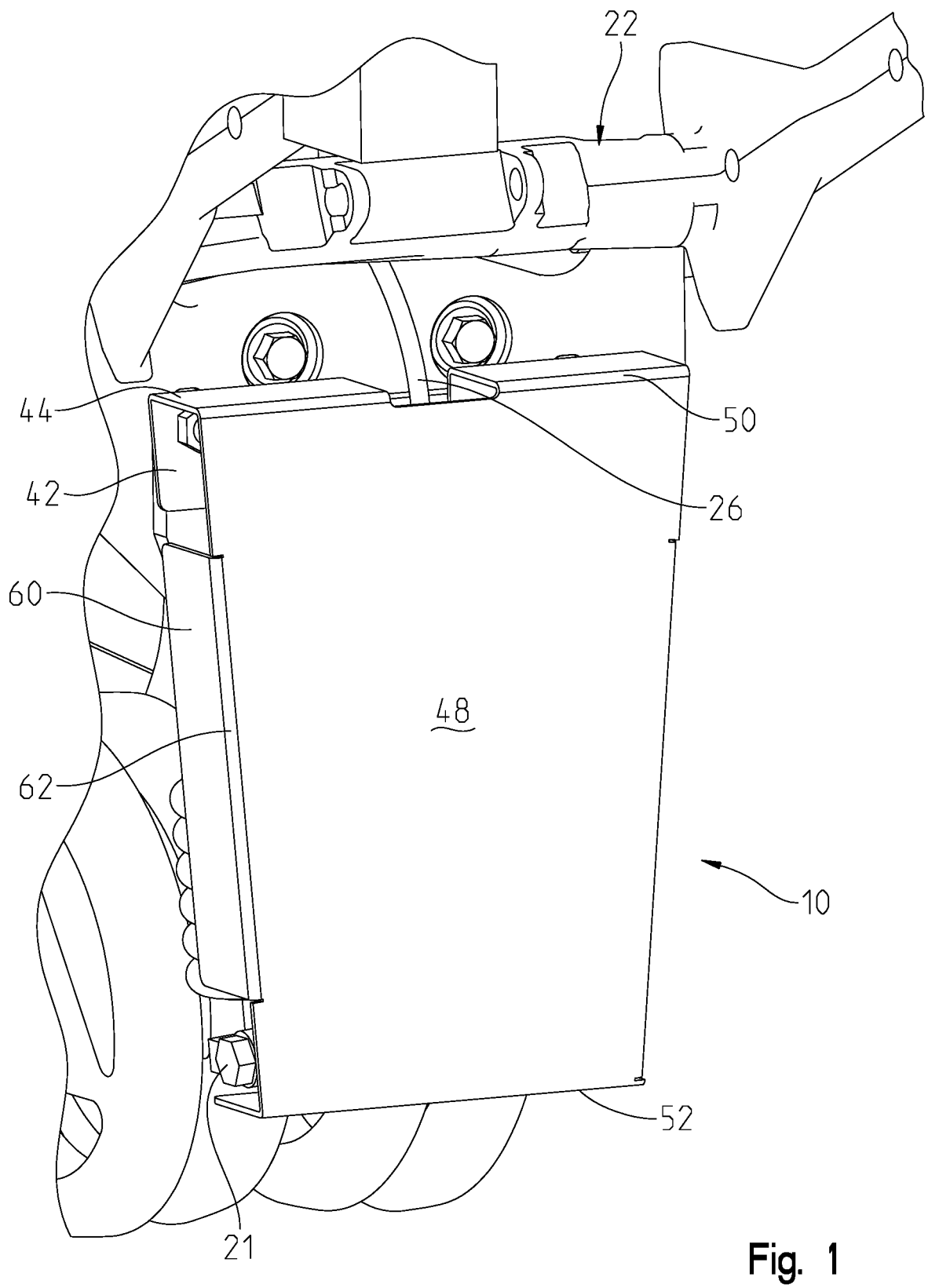
FIG. 1 is a front isometric view of the cover as installed on a fertilizer placement system.
Figure 2:
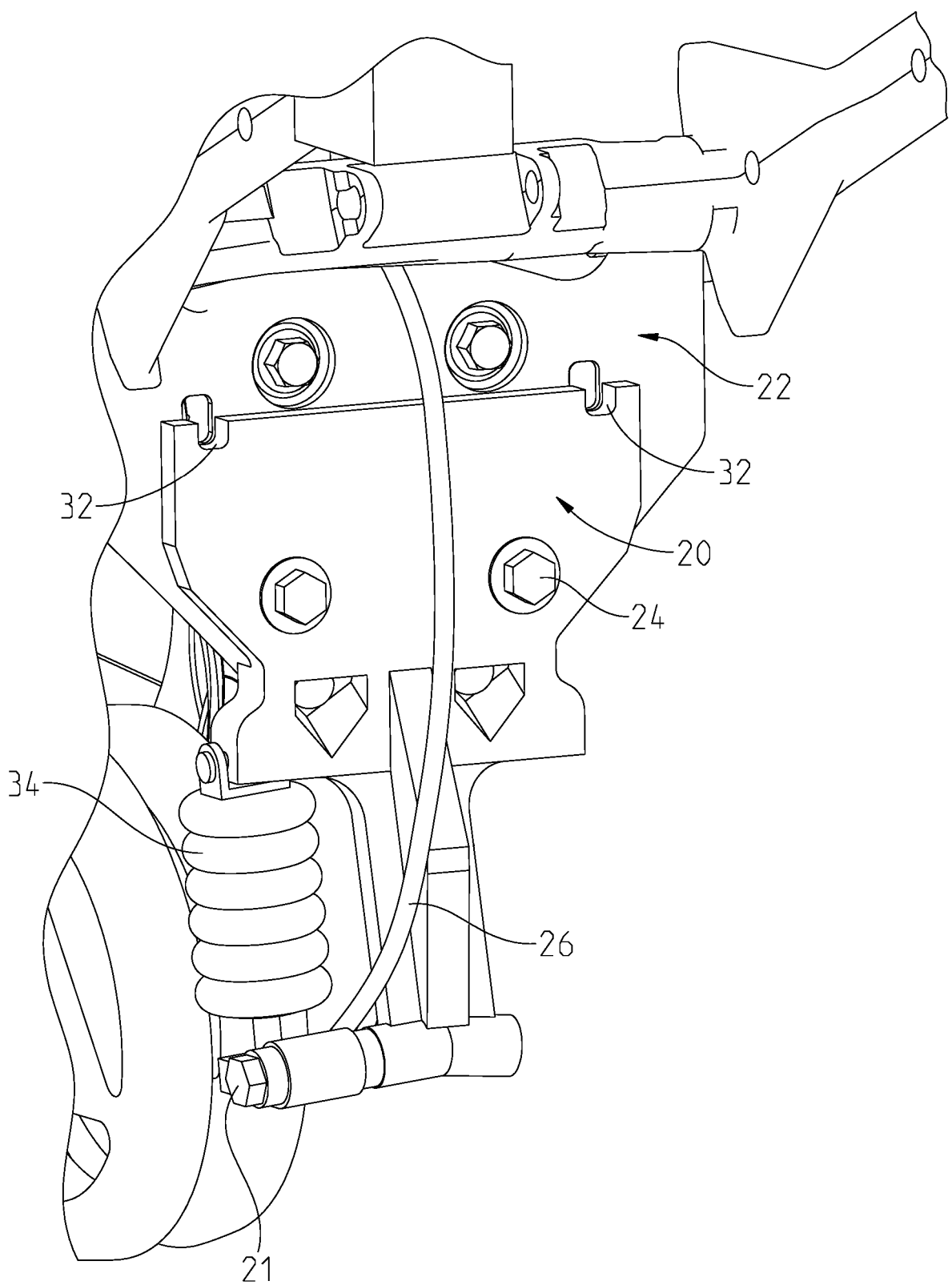
FIG. 2 is a front isometric view of the system as shown in FIG. 1 with the cover removed.
Figure 3:
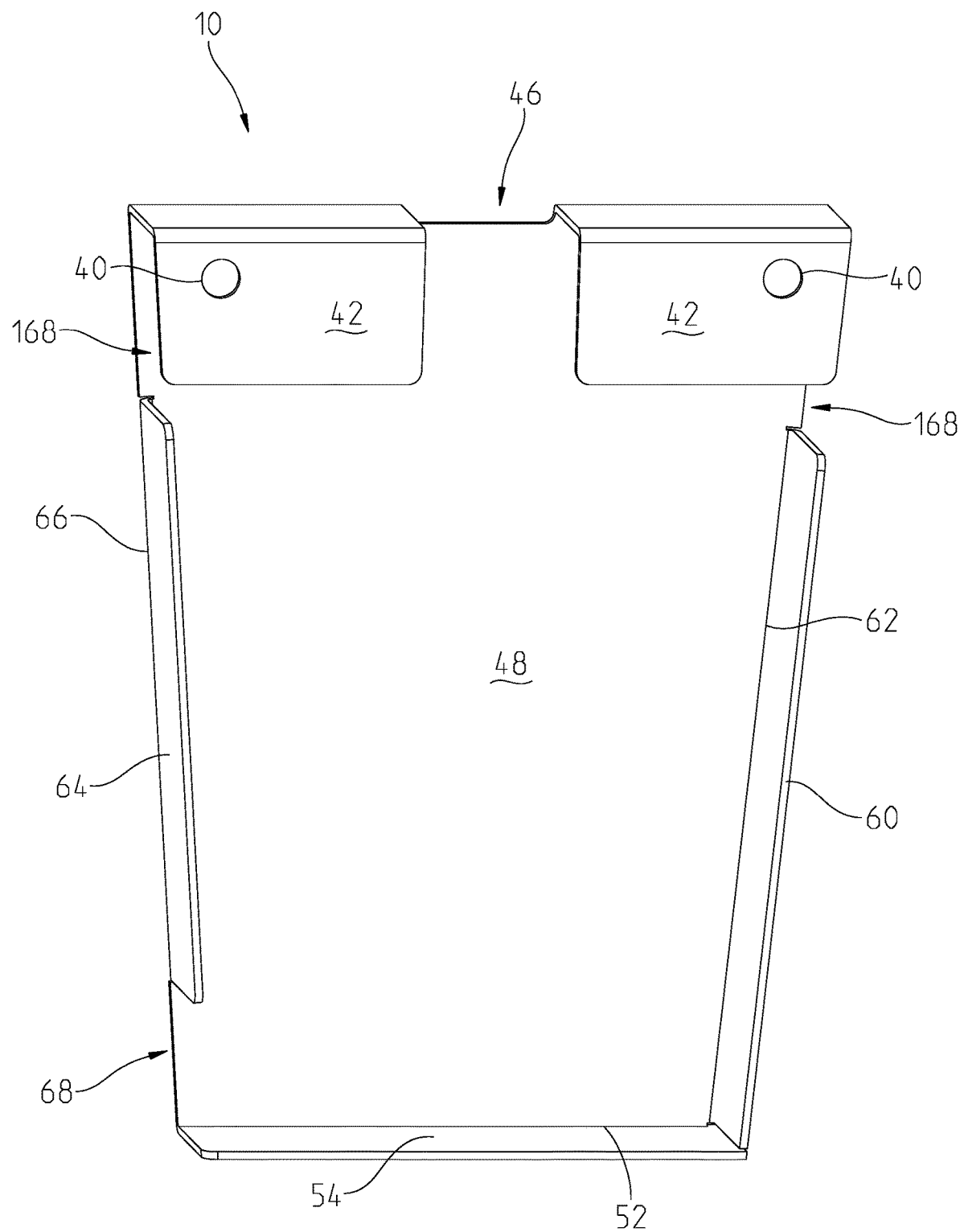
FIG. 3 is a rear isometric view of the cover as shown in FIG. 1.
Figure 4:
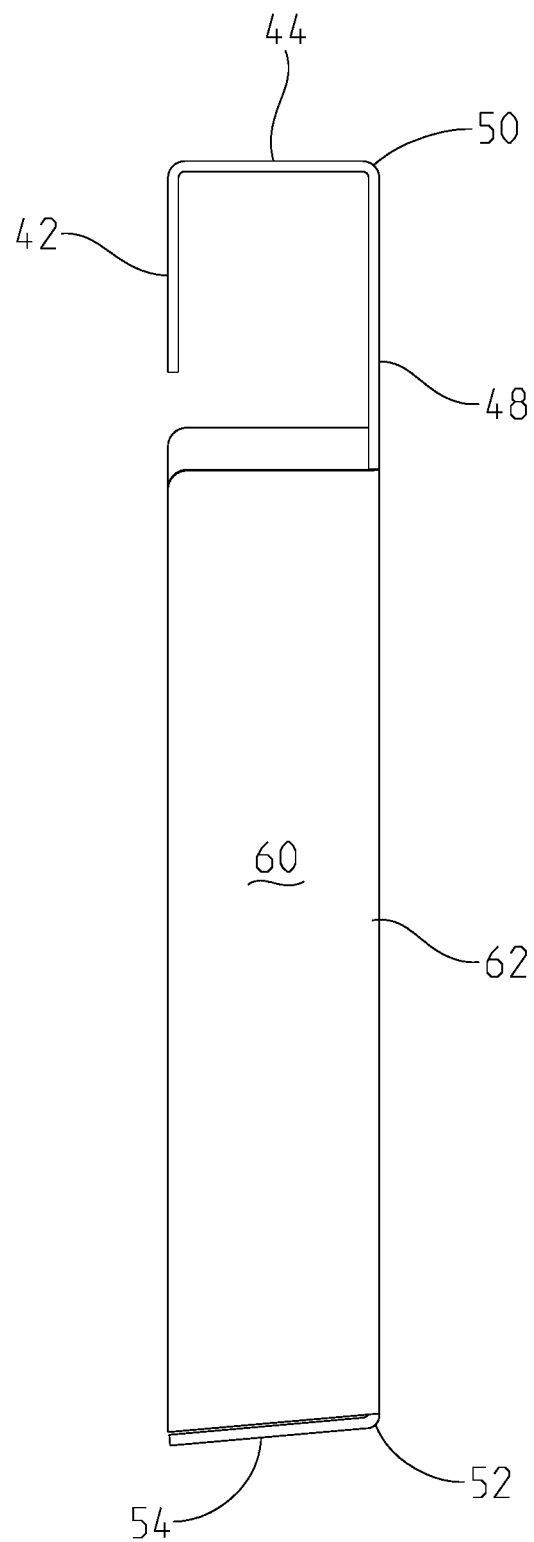
FIG. 4 is a left side view of the cover.

A protective cover 10 is shown in FIG. 3 and as attached to a fertilizer placement system 20 in FIG. 1. The fertilizer placement system 20 is attached to a seed planter 22 through fasteners, such as bolts 24. As shown, the protective cover 10 can be installed without modification to the existing seed planter or fertilizer placement system 20, utilizing existing mounting features. The seed planter 22 is towed behind or attached to a tractor or equivalent farming implement (not shown). The tractor may provide any necessary power or control to operate the seed planter 22 and/or fertilizer placement system 20. The fertilizer placement system 20 has a tank or series of tanks (not shown) that hold liquid fertilizer. The liquid fertilizer placement system 20 may be single-sided or dual-sided, with liquid fertilizer being placed on one or both sides of the planting row. The fertilizer placement system 20 shown in FIG. 2 is single-sided. The protective cover 10 can be adapted to be used with a single-sided or dual-sided fertilizer placement system 20. Depending on the configuration of the system 20, the cover 10 may have different features that are specific to the different configurations, such as an access gap 68 to accommodate a pivot point 21. It is further contemplated that the cover 10 is universal and can be used with any configuration of the fertilizer placement system 20. Pumps, valves, manifolds, or similar fluid control devices may be located between the tank and where the fertilizer is dispensed.

Figure 7:
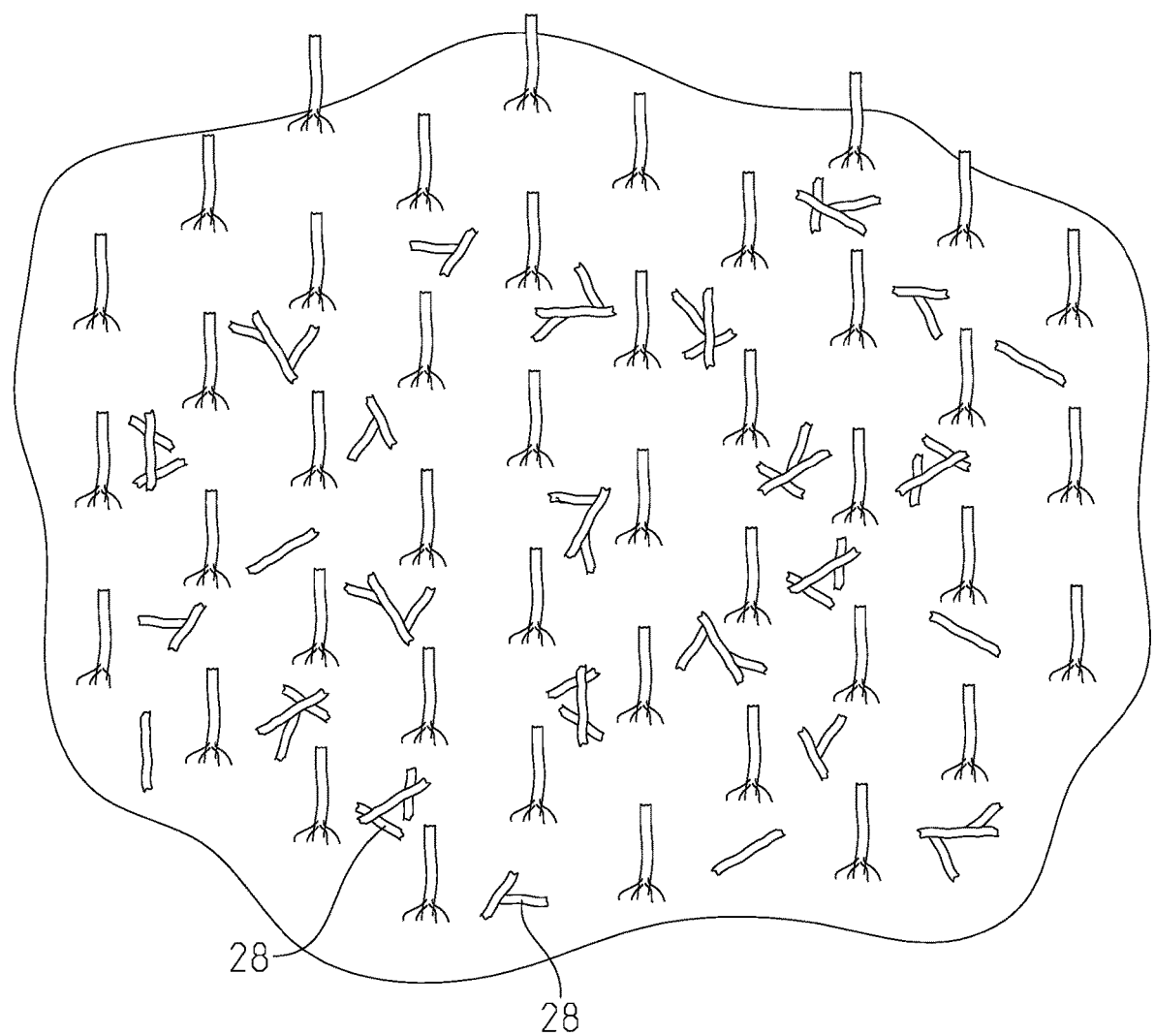
FIG. 7 is a partial view of a no-till field with plant residue.
Figure 8:
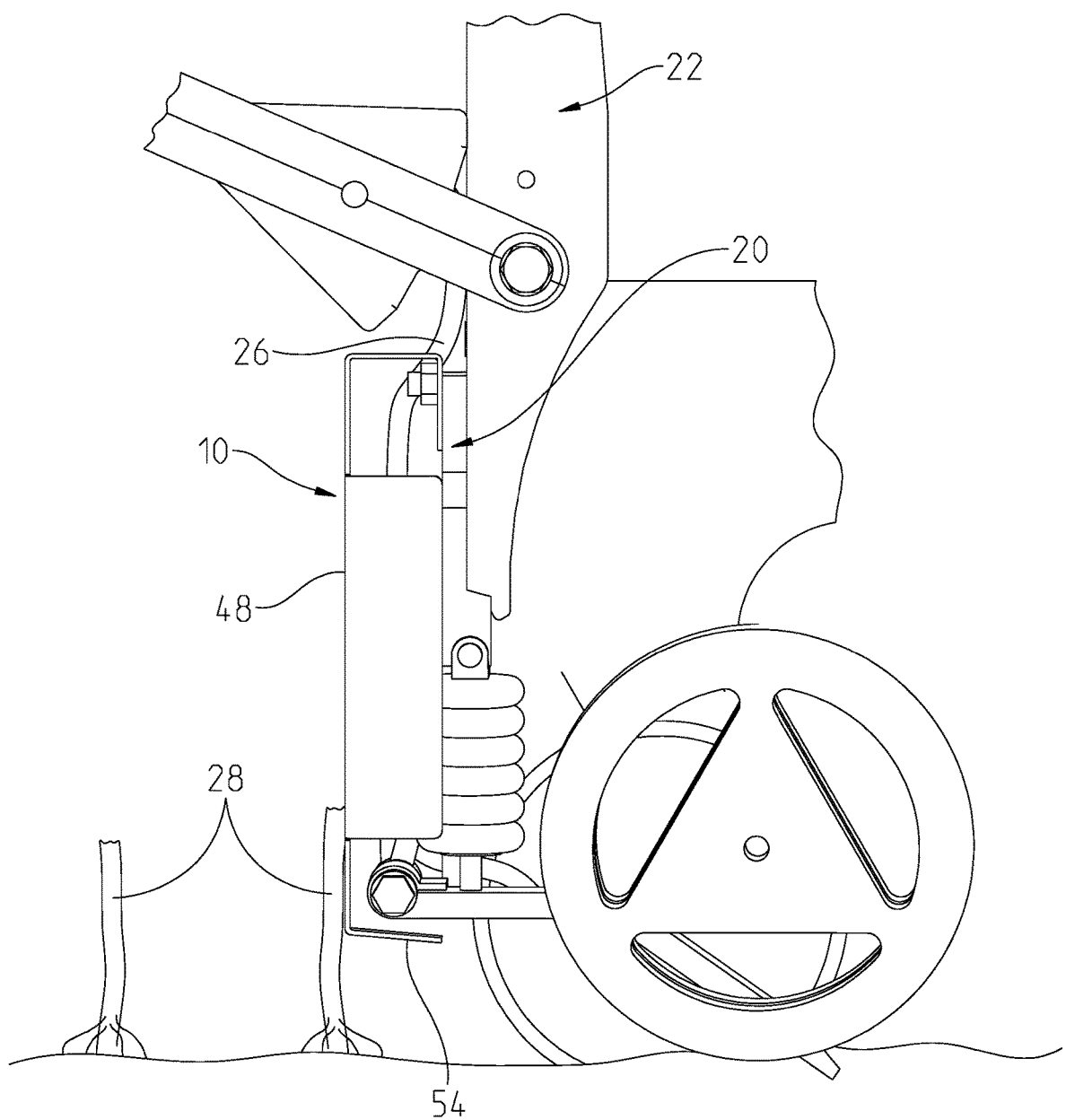
FIG. 8 is a right side view of the cover as installed while planting the field as shown in FIG. 7.

Tubing 26 that carries the liquid fertilizer runs along the fertilizer placement system 20 as shown in FIG. 2. Although one tube is shown in the FIGS, a dual-sided fertilizer placement system may have two tubes or a fitting, manifold, or valve where the tubing 26 splits into two separate tubes. This is the leading edge of the fertilizer placement system 20 (with the tubing 26 exposed), meaning that as the seed planter 22 is pulled through the field by the tractor, this portion of the fertilizer placement system 20 is first to contact any leftover plant matter 28 from the previous crop that sticks up out of the ground. The tubing 26 is in a vulnerable position. The previous crop and leftover plant matter is shown in FIGS. 7 and 8. Without the protective cover 10, the leftover plant matter 28 can contact, become entangled with, and sever, kink, or otherwise damage the tubing 26, creating leaks or other issues. The protective cover 10, as shown in FIG. 8, provides a necessary barrier. While the leftover plant matter 28 shown in FIG. 8 is relatively uniform, the real-world plant matter can be at different heights, orientations, or angles. Due to this relative randomness of the leftover plant matter 28 in direction, size, and shape, any gap or opening can result in the matter becoming driven up between, around, or into the tubing 26, severing it. As can be seen in FIGS. 1 and 8, the protective cover 10 does not provide complete protection for the entire length of the tubing 26 but it provides a protective barrier to areas most susceptible to damage.

The protective cover 10, as shown, is made from a single piece of formed sheet metal. However, it is contemplated that the protective cover is formed from an assembly of parts or another rigid or semi-rigid material, such as reinforced plastic, cast material, or epoxy. As installed, the protective cover 10 provides a protected area for the tubing 26 that is shielded from leftover plant matter 28.

The protective cover 10 can be attached directly to the fertilizer placement system 20 with bolts 24 that are also shared when the system 20 is attached to the seed planter 22. This is accomplished by using mounting apertures 40 that align with upper holes 32, shown in FIG. 2. The mounting apertures 40 are located on a mounting flange 42 and may vary in spacing and size, depending on the system 20 currently in use on the seed planter 22. The mounting flange 42 is connected to a leading wall 48 through a standoff wall 44. As shown, the mounting flange 42 and standoff wall 44 have a tube gap 46 or interruption to allow the tubing 26 to pass between the protective cover 10 and fertilizer placement system 20. The tube gap 46 does not need to completely interrupt the standoff wall 44 (as it is shown in the FIGS.), but it should allow the tubing 26 to be routed. The tube gap 46 provides a convenient mounting arrangement that does not require the tubing 26 to be disconnected during installation of the protective cover 10. The standoff wall 44 is located at a top transverse edge 50 of the leading wall 48. Extending from a bottom transverse edge 52 (opposite the top transverse edge 50) is an angled bottom wall 54. The angled bottom wall 54 is shown at an obtuse angle with respect to the leading wall 48 to allow travel of the system 20 without extending too close to the ground. It is contemplated that the bottom wall is perpendicular or even acutely angled with respect to the leading wall 48. The leading wall 48 is shown as flat surface, but other shapes are contemplated. The fertilizer placement system 20 has a pivoting arm with the pivot point 21 that is protected by the angled bottom wall 54 and bottom of the leading wall 48. This is shown in FIG. 1. For a dual-sided fertilizer placement system 20, two pivot points 21 will likely be present. The angled bottom wall 54 prevents leftover plant matter 28 from being driven between the fertilizer placement system 20 and leading wall 48. As is shown in the FIGS, the standoff wall 44, side walls 60, 64, and angled bottom wall 54 all extend from the leading wall 48 in the same direction. In other words, none of the other walls extend beyond the leading wall 48.

Figure 5:
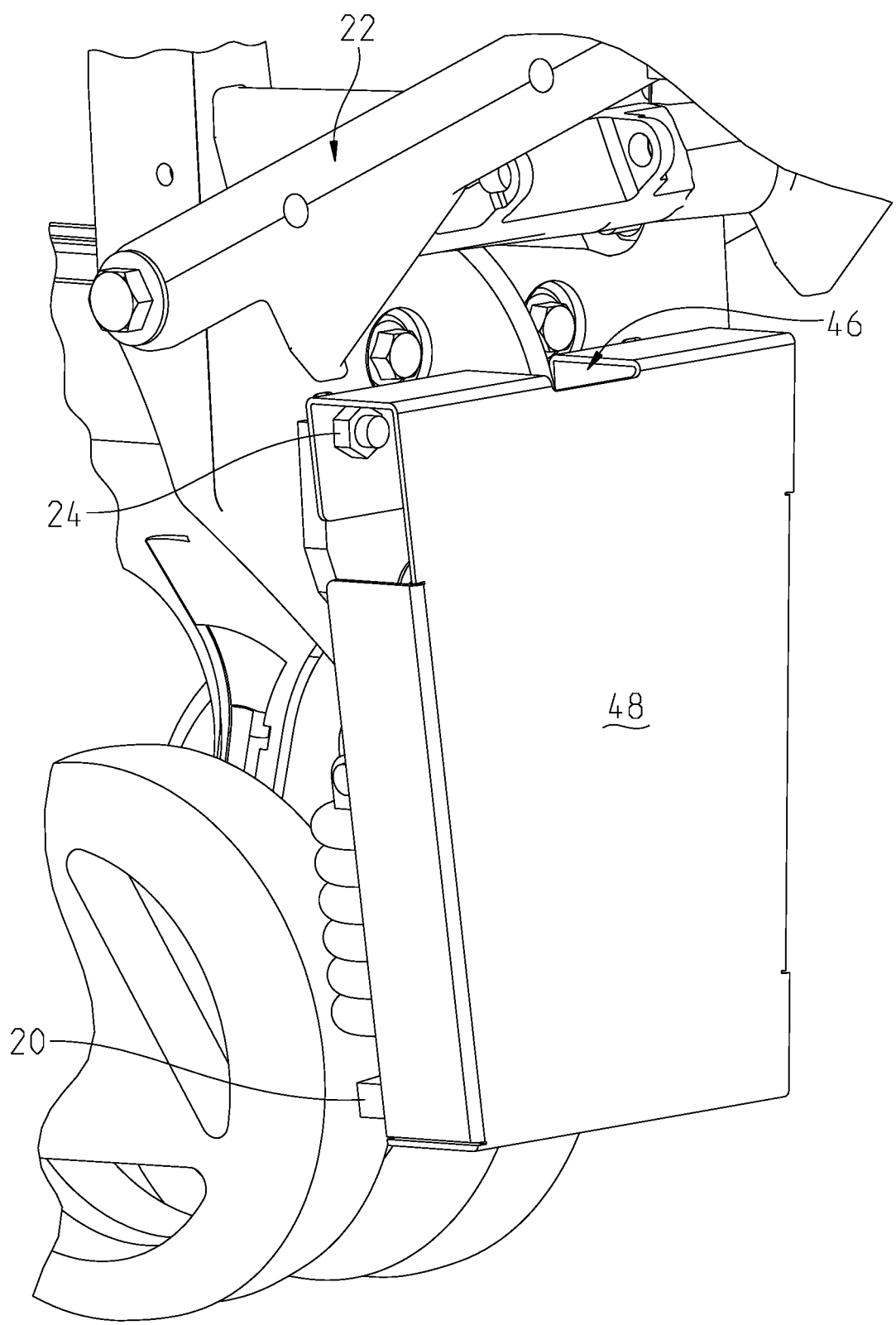
FIG. 5 is a front left isometric view of an alternate embodiment of the cover as installed on a fertilizer placement system.
Figure 6:
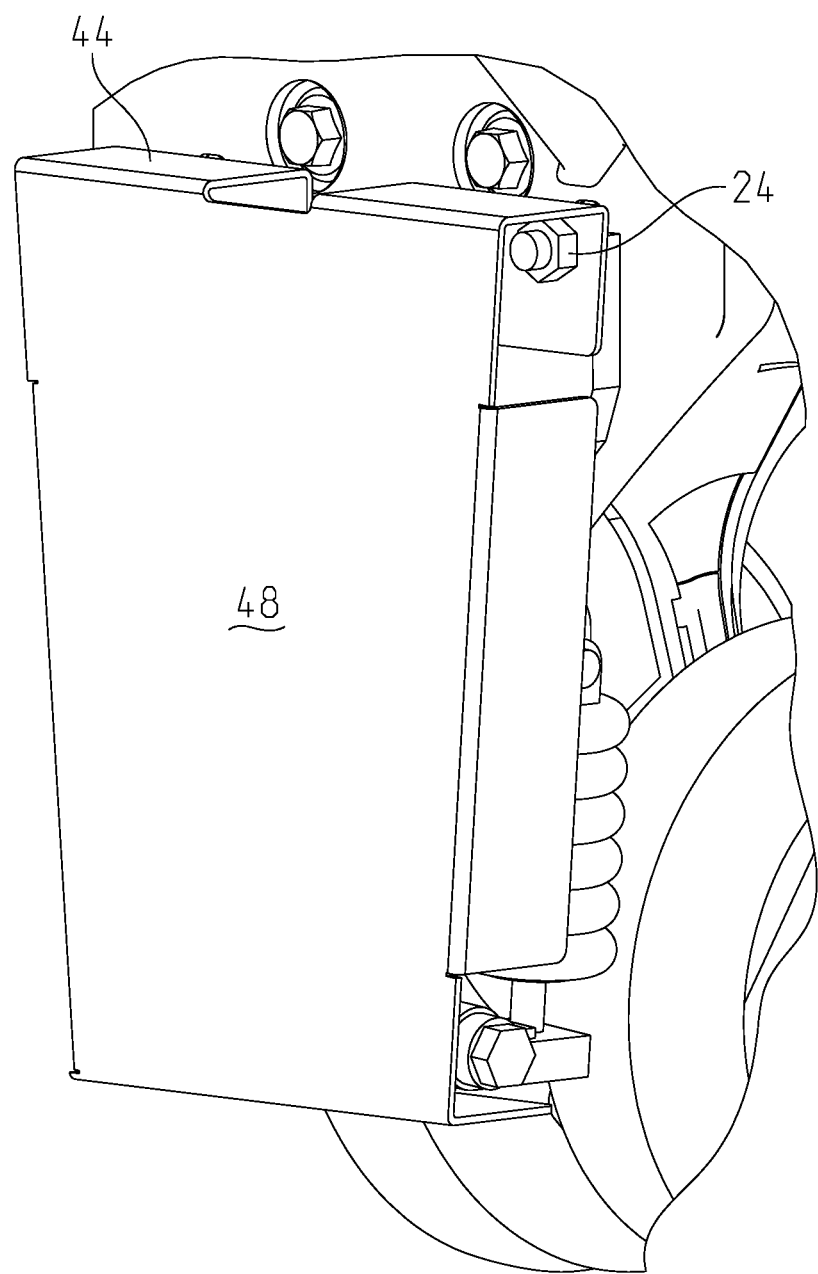
FIG. 6 is a front right isometric view of the alternate embodiment as shown in FIG. 5.

The protective cover 10 has side walls 60, 64 each extending from corresponding lateral edges 62, 66. One of the side walls 64 has an access gap 68 for clearance or access to components on the fertilizer placement system 20. This is shown in FIG. 1. As installed, a portion of the fertilizer placement system 20 is located in the access gap 68, which significantly reduces the chance of leftover plant matter 28 being driven between the protective cover 10 and fertilizer placement system 20. Both side walls 60, 64 stop short of the standoff wall 44 to form upper access gaps 168 to install the protective cover 10. Access to the bolts 24 is shown in FIG. 6. For clarity, FIGS. 5 and 6 shows an alternate embodiment of the protective cover 10 that is used if the fertilizer placement system 20 is configured with a single side on the opposite side shown in FIG. 2. If the protective cover 10 is used with a dual-sided placement system, the protective cover 10 could have two access gaps 68 and side wall 60 would appear more like side wall 64. The access gap 68 provides user access to moving parts in the event the user needs to service the fertilizer placement system 20.

To install the cover 10, the user removes the top bolts 24 as shown in FIG. 2, exposing the upper holes 32. The user then positions the cover 10 with the mounting apertures 40 aligned with the upper holes 32. The user then places the top bolts 24 through the upper holes 32 and mounting apertures 40. The top bolts 24 are tightened down through the upper access gaps 168, which brings the protective cover 10 into contact with the system 20. As installed, the cover 10 shields and protects other portions of the system 20, such as a bellows covered spring 34, shown in FIG. 2. When planting, the protective cover 10 deflects any leftover plant matter 28.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:
1. A protective cover in combination with a fertilizer placement system, said fertilizer placement system having a liquid fertilizer tube, said fertilizer placement system attached to a seed planter through fasteners, said cover comprising:
    a leading wall having a standoff wall extending therefrom at a top transverse edge of said leading wall, a mounting flange affixed to said standoff wall and having mounting apertures to align with said fasteners on said fertilizer placement system, said mounting flange and said standoff wall interrupted by a tube gap, said liquid fertilizer tube passing through said tube gap;
    said leading wall having an angled bottom wall located at a bottom transverse edge, said angled bottom wall obliquely angled with respect to said leading wall;
    said leading wall having side walls extending from lateral edges on said leading wall, said side walls spaced from said standoff wall, said side walls, said standoff wall, and said angled bottom wall extend from said leading wall in the same direction; and
    a portion of said liquid fertilizer tube is located between said protective cover and said fertilizer placement system.

2. The protective cover in claim 1, wherein said protective cover is formed from sheet metal.

3. The protective cover in claim 1, wherein said leading wall is flat.

4. The protective cover in claim 1, wherein said protective cover is formed from a single piece of sheet metal.

5. The protective cover in claim 1, wherein one of said side walls extends to said angled bottom wall.

6. The protective cover in claim 1, wherein one of said side walls is spaced from said angled bottom wall.

7. The protective cover in claim 1, wherein said fertilizer placement system has a spring, said leading wall and one of said side walls protecting said spring.

8. A protective cover affixed to a fertilizer placement system, said fertilizer placement system having a liquid fertilizer tube, said fertilizer placement system attached to a seed planter through fasteners, said cover is formed from a single piece of sheet metal, said cover comprising:
    a leading wall having a standoff wall extending therefrom at a top transverse edge of said leading wall, a mounting flange affixed to said standoff wall and having mounting apertures to align with said fasteners on said fertilizer placement system, said mounting flange and said standoff wall interrupted by a tube gap, said liquid fertilizer tube passing through said tube gap;
    said leading wall having a bottom wall located at a bottom transverse edge;
    said leading wall having side walls extending from lateral edges on said leading wall;
    when said protective cover is affixed to said fertilizer placement system, a portion of said liquid fertilizer tube is located between said protective cover and said fertilizer placement system.

9. The protective cover in claim 8, wherein said protective cover is formed from sheet metal.

10. The protective cover in claim 8, wherein said leading wall is flat.

11. The protective cover in claim 8, wherein one of said side walls extends to said angled bottom wall.

12. The protective cover in claim 8, wherein one of said side walls is spaced from said angled bottom wall.

13. The protective cover in claim 8, wherein said side walls, said standoff wall, and said angled bottom wall extend from said leading wall in the same direction.

14. The protective cover in claim 8, wherein said fertilizer placement system has a spring, said leading wall and one of said side walls protecting said spring.

15. A protective cover for use with a fertilizer placement system having a liquid fertilizer tube, said fertilizer placement system attached to a seed planter through fasteners, said cover comprising:
- a leading wall having a standoff wall extending therefrom at a top transverse edge of said leading wall, a mounting flange affixed to said standoff wall and having mounting apertures to align with said fasteners on said fertilizer placement system;
- said leading wall having an angled bottom wall located at a bottom transverse edge, said angled bottom wall obliquely angled with respect to said leading wall;
- said leading wall having side walls extending from lateral edges on said leading wall, said side walls, said standoff wall, and said angled bottom wall extend from said leading wall in the same direction;
- when said protective cover is affixed to said fertilizer placement system, a portion of said liquid fertilizer tube is located between said protective cover and said fertilizer placement system.

16. The protective cover in claim 15, wherein said leading wall is flat.

17. The protective cover in claim 15, wherein one of said side walls is spaced from said angled bottom wall.

18. The protective cover in claim 15, wherein said fertilizer placement system has a spring, said leading wall and one of said side walls protecting said spring.

* * * * *